US008626816B2

(12) United States Patent
Weinberg et al.

(10) Patent No.: US 8,626,816 B2
(45) Date of Patent: Jan. 7, 2014

(54) METHOD, SYSTEM AND COMPUTER PROGRAM PRODUCT FOR DETECTING ERRORS IN FIXED POINT DIVISION OPERATION RESULTS

(75) Inventors: Joshua M. Weinberg, Bronx, NY (US); Martin S. Schmookler, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 12/037,408

(22) Filed: Feb. 26, 2008

(65) Prior Publication Data

US 2009/0216825 A1    Aug. 27, 2009

(51) Int. Cl.
*G06F 7/52* (2006.01)
(52) U.S. Cl.
USPC .......................................... 708/650; 708/530
(58) Field of Classification Search
None
See application file for complete search history.

(56) References Cited

U.S. PATENT DOCUMENTS

| | | | |
|---|---|---|---|
| 4,488,247 A | 12/1984 | Inagami et al. | |
| 4,817,048 A | 3/1989 | Rawlinson | |
| 4,878,190 A | 10/1989 | Darley et al. | |
| 5,046,038 A | 9/1991 | Briggs et al. | |
| 5,386,376 A * | 1/1995 | Girard et al. | 708/656 |
| 5,644,524 A | 7/1997 | Van Aken et al. | |
| 5,903,486 A * | 5/1999 | Curtet | 708/655 |
| 5,937,202 A | 8/1999 | Crosetto | |
| 6,185,596 B1 | 2/2001 | Hadad et al. | |
| 6,487,515 B1 | 11/2002 | Ghoshal | |
| 6,560,624 B1 | 5/2003 | Otani et al. | |
| 6,625,633 B1 | 9/2003 | Hirairi | |
| 7,185,041 B1 * | 2/2007 | End, III | 708/656 |
| 2003/0050948 A1 | 3/2003 | Okawa | |
| 2004/0128337 A1 | 7/2004 | Roussel et al. | |
| 2006/0179092 A1 | 8/2006 | Schmookler et al. | |

OTHER PUBLICATIONS

"IBM® z/Architecture Principles of Operation", Publication No. SA22-7832-05, 6th Edition, Apr. 2007. 1,215 pages separated into 4 electronic attachments.
U.S. Appl. No. 12/036,397 Non-Final Office Action dated Mar. 3, 2011.
U.S. Appl. No. 12/036,387 Non-Final Office Action dated Mar. 30, 2011.
U.S. Appl. No. 12/037,207 Non Final Office Action dated Mar. 3, 2011.

* cited by examiner

*Primary Examiner* — Michael D Yaary
(74) *Attorney, Agent, or Firm* — Cantor Colburn LLP; John Campbell

(57) ABSTRACT

A method, computer program product and a system for detecting errors in a result of a fixed-point division operation are provided. The method includes: receiving a result of a fixed-point division operation for a dividend and a divisor; performing a first comparison of the divisor and a remainder of the result; performing a second comparison of a sign of the dividend and a sign of the remainder; and determining whether the result is correct based on the first comparison and the second comparison.

11 Claims, 2 Drawing Sheets

METHOD, SYSTEM AND COMPUTER PROGRAM PRODUCT FOR DETECTING ERRORS IN FIXED POINT DIVISION OPERATION RESULTS

BACKGROUND OF THE INVENTION

This invention relates generally to microprocessing, and more particularly to providing methods to improve fixed-point arithmetic operations.

Fixed-point divide, also known as integer divide, instructions may be carried out by any of a number of algorithms. Some implementations of fixed-point divide are based on the SRT (Sweeney Robertson Tocher) divide algorithm, which is similar to the repeated subtraction method often done by hand called "long division". Other implementations of integer divide include "iterative" algorithms, like the Newton-Raphson and Goldschmidt algorithms. These algorithms start with an estimate of the quotient and iterate on that estimate, improving the precision during each iteration, until the required quotient precision is achieved.

When designing the logic and circuits for complex instructions such as the algorithms described above, it is important to note that errors may occur during execution of the algorithm, either due to errors in the design (including the algorithm itself) or due to circuit malfunctions such as manufacturing faults or rare environmental disturbances. Functional checking of these types of fixed-point divide algorithms and their results using formal verification techniques is not currently available, and such checking would only serve to eliminate design flaws, as opposed to malfunctions occurring during execution.

Accordingly, other techniques have been devised to try and verify the correctness of the algorithm and/or the result. For example, previous machines have focused on verifying the divide instruction's internal verifiable mathematical operations using parity and residue checks. While these techniques can verify the correctness of each internal operation, they do not speak to the correctness of the final result.

Thus, it would be desirable to be able to detect errors based on the final result of a fixed-point divide algorithm. Such an ability would be useful in providing a method to verify the actual results of a divide operation without the complexity and uncertainty of verifying each mathematical step in the algorithm.

BRIEF SUMMARY OF THE INVENTION

An exemplary embodiment includes a method of detecting errors in a result of a fixed-point division operation. The method includes: receiving a result of a fixed-point division operation for a dividend and a divisor; performing a first comparison of the divisor and a remainder of the result; performing a second comparison of a sign of the dividend and a sign of the remainder; and determining whether the result is correct based on the first comparison and the second comparison.

Another exemplary embodiment includes a computer program product for detecting errors in a result of a fixed point division operation. The computer program product includes a computer-readable storage medium for storing instructions for executing a method of: receiving a result of a fixed-point division operation for a dividend and a divisor; performing a first comparison of the divisor and a remainder of the result; performing a second comparison of a sign of the dividend and a sign of the remainder; and determining whether the result is correct based on the first comparison and the second comparison.

A further exemplary embodiment includes a system for detecting errors in a result of a fixed point division operation. The system includes: an instruction dispatching unit (IDU) for sending an instruction to perform a division operation for a dividend and a divisor, and a processor in operable communication with the IDU. The processor performs: receiving the instruction from the IDU; calculating a result of a fixed point division operation for a dividend and a divisor; performing a first comparison of the divisor and a remainder of the result; performing a second comparison of a sign of the dividend and a sign of the remainder; and determining whether the result is correct based on the first comparison and the second comparison.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides a method and computer program product for detecting errors in a result of a fixed-point divide operation. The method includes comparing a remainder corresponding to the fixed-point divide's result with a divisor used in the divide operation. In one embodiment, the method includes i) comparing a magnitude of the remainder, i.e., the remainder magnitude, with a magnitude of the divisor, i.e., the divisor magnitude, and ii) comparing a sign of the remainder with a sign of a dividend used in the divide operation, in order to verify correctness of the result. This method is particularly useful in detecting circuit malfunctions independent of the algorithm design. Such errors in the divide result occurring from such malfunctions are easily detected by the method described herein.

The methods described herein are provided for use with any type of algorithm that performs the fixed-point divide operation. For example, the methods described herein may be used with algorithms such as the SRT algorithm, as well as the Newton-Raphson and Goldschmidt algorithms.

Any fixed-point divide algorithm that takes two integer numbers and, from those numbers, performs an integer divide operation to compute an integer quotient is referred to herein as the "fixed-point divide" algorithm.

Figure 1:
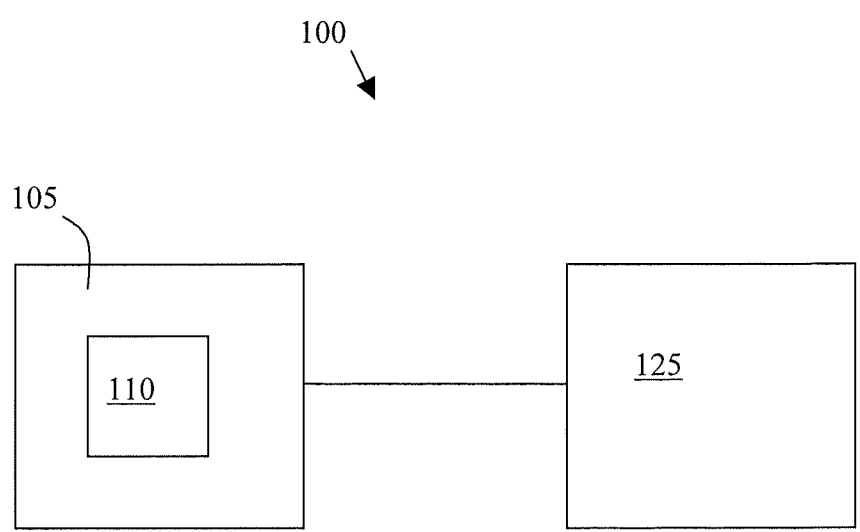
FIG. 1 is an exemplary embodiment of a system for performing methods described herein.

FIG. 1 depicts a system 100 suitable for implementing the method for determining a required quotient precision. The system 100 includes a microprocessor 105 or other processor, such as a FPU or a central processing unit (CPU) which includes a processor function 110 for performing the method. The system also includes an optional instruction dispatching unit (IDU) 125 for receiving information from the microprocessor 105 and dispatching instructions to the microprocessor 105. The system 100 described herein is merely exemplary. The system may include any additional components as necessary to provide for processing of data. Exemplary components include, without limitation, storage, memory, input devices, output devices and the like. As these components are known to those skilled in the art, these are not depicted in any detail herein.

Figure 2:
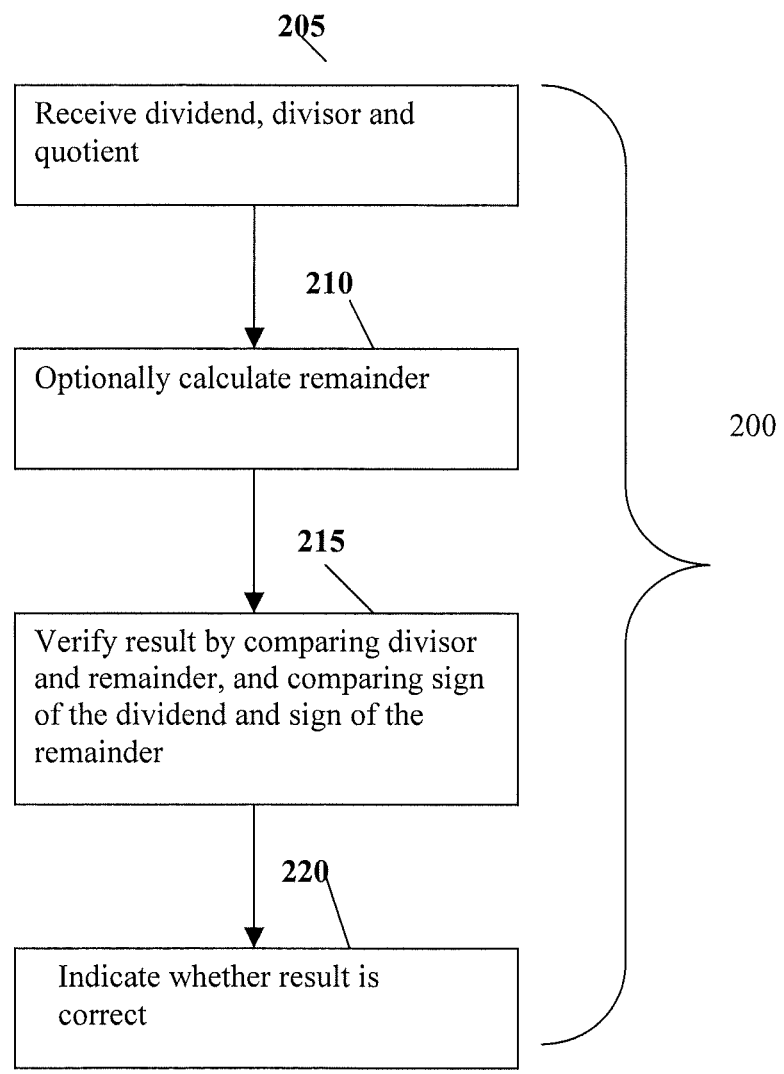
FIG. 2 is a flow chart providing an exemplary method for detecting errors in a result of a fixed-point divide operation.

Referring to FIG. 2, there is provided a method 200 for detecting errors in a result of a fixed-point division operation. The method 200 includes one or more stages 205, 210, 215 and 220. The method 200 is described herein in conjunction with a microprocessor or execution unit within a microprocessor, although the method 200 may be performed in conjunction with any type, number and configuration of processors.

In the first stage 205, the processor, FPU or other hardware, receives data for two operands, i.e., a dividend and a divisor. The processor also receives data in the form of a result of a fixed-point divide operation for the dividend and the divisor. In one embodiment, the result includes a quotient and/or a remainder calculated by the fixed-point divide operation. The processor may perform the fixed-point divide operation, such as in response to an instruction from the instruction dispatch unit, or otherwise receive the result from another processor or logical unit.

In one embodiment, the fixed-point divide operation is any of the algorithms described herein, such as the SRT, the Newton-Raphson and Goldschmidt algorithms, and any other algorithms that implement fixed-point divide.

In one embodiment, the remainder is calculated as part of the fixed-point divide operation. In another embodiment, the remainder is separately calculated based on the divisor, the dividend, and the quotient received as the result of the operation.

In both embodiments, the remainder is calculated based on the following equation:

$$Rem = A - Qt*B,$$

where "Qt" is the computed fixed-point result, i.e., the quotient, "A" is the dividend, and "B is the divisor.

Alternatively, the remainder may be validated by showing that the following is true:

$$A = Qt*B + Rem.$$

In the third stage 215, the divisor is compared to the remainder and the sign of the dividend is compared to the sign of the remainder to determine whether the result of the fixed-point divide operation is correct.

In one embodiment, the magnitude of the divisor, i.e., the divisor magnitude, is compared to the magnitude of the remainder, i.e., the remainder magnitude. Also, the sign of the remainder and the sign of the dividend is compared. As described herein, the "sign" of a value refers to whether the value is a positive or a negative value. In one embodiment, the magnitude of a data unit, such as the dividend, the divisor and the remainder, refers to the number of significant digits or bits.

In one embodiment, the operands are converted to floating point numbers, then division takes place using a modified floating point divide algorithm, and finally the quotient is converted to an integer. When the operands are in floating point representation, their exponents correspond to the number of significant bits in the fixed point integer representation. In this embodiment, the remainder may be calculated from the quotient and the operands. If the remainder is also in floating point representation, its exponent also corresponds to its magnitude. Thus, in this embodiment, the magnitudes of the divisor and remainder may be compared by comparing only their exponents.

In these embodiments, the quotient is considered to be correct if the remainder magnitude is less than or equal to the divisor magnitude, and the remainder has the same sign as the dividend.

The remainder magnitude and the divisor magnitude are compared. If the remainder magnitude is larger than the divisor magnitude, then the quotient is too small and is thus incorrect. Furthermore, the sign of the remainder is compared to the sign of the dividend. If the sign of the remainder is different than the sign of the dividend, then the quotient is too large and is incorrect. As will be shown below, if the magnitude of the remainder is smaller than or equal to the magnitude of the divisor, and the sign of the remainder is the same as the sign of the dividend, then the calculated quotient is correct.

In another embodiment, the value of the divisor, i.e., the divisor value, is compared to the value of the remainder, i.e., the remainder value. The sign of the remainder is also compared to the sign of the dividend.

In this embodiment, the quotient is considered to be correct if the absolute value of the remainder is less than the absolute value of the divisor, and the remainder has the same sign as the dividend.

The remainder value and the divisor value are compared. If the remainder value is greater than or equal to the divisor value, then the quotient is too small and is thus incorrect. Furthermore, the sign of the remainder is compared to the sign of the dividend. If the sign of the remainder is different than the sign of the dividend, then the quotient is too large and is incorrect. If the remainder value is smaller than the divisor value, and the sign of the remainder is the same as the sign of the dividend, then the calculated quotient is correct.

An example of the comparison described in stage 215 is described. In this example, "Q" refers to an infinitely precise quotient of integers A/B, and "Qt" refers to Q truncated to an integer. Qt may be expressed as the following equation:

$$Qt = Q - et,$$

As referred to herein, "et" is the fractional part of Q. It may also be thought of as the error resulting from the truncation of quotient Q, i.e., the truncation error. In this example, $|et| < 1$, and et has the same sign as Q. "$|et|$" refers to an absolute value of et.

Accordingly, the remainder may be expressed as the following equation:

$$Rem = A - Qt*B$$

which may be expressed, based on the equation for Qt, as the following:

$$Rem = A - (Q - et)*B,$$

which may alternatively be expressed as:

$$Rem = A - Q*B + et*B.$$

Because, in this example, Q is infinitely precise, $A - Q*B = 0$, and the resulting equation for the remainder may be expressed as:

$$Rem = et*B.$$

From the above equations, because $|et| < 1$, it should follow that $|Rem| < |B|$, i.e., the absolute value of the remainder must be less than the absolute value of the divisor. Furthermore, given that $Q = A/B$, and et has the same sign as Q, Rem must have the same sign as A. Thus, if these conditions are met, i.e. the magnitude of the remainder is less than the magnitude of the divisor and the signs of the remainder and the dividend are the same, the result of the fixed-point divide operation is correct.

Likewise, if $|Rem| >= |B|$, then it should follow that $|et| >= 1$, meaning that Qt could be incremented and still be less than or equal to Q. Furthermore, if the sign of Rem is not the same as the sign of A, then it should follow that $|Qt*B| > |A|$, meaning that $|Qt| > |Q|$. Therefore, for both cases, Qt is not the correct result. It may be noted that, in this example, if the value of the remainder Rem is greater than or equal to the value of the divisor B, the quotient Qt is incorrect. In the embodiments in which the magnitudes (i.e., number of significant bits) of the remainder and the divisor are compared, the quotient is considered incorrect if the remainder magnitude is greater than the divisor magnitude.

In a fourth stage 220, the processor, after determining whether the quotient is correct based on the above comparison, may indicate to a user or another logical unit the result of the comparison. In other words, the processor may provide an indication as to whether the quotient is correct, or whether an error occurred in the divide operation.

The methods described herein are particularly suited to detecting errors occurring during execution of a divide operation that result from malfunctions in a circuit or from environmental interferences. Such errors are likely to occur in one or more random bit positions of the result, and thus the corresponding remainder that is calculated using that quotient would then be many times larger than the divisor, thereby having many more significant bits than the divisor, or differ in sign from the dividend.

The methods may also be advantageously used in conjunction with methods for verifying the correctness of the underlying algorithm. Such methods for verifying the underlying algorithm may be used to detect small errors resulting from design flaws in the algorithm. In such cases, the remainder may have the same number of bits (i.e., the same magnitude) as the divisor, but the remainder may possibly be larger in value than the divisor, and the quotient result would be incorrect. In such a case, the use of a method for verifying the underlying algorithm may be utilized so that errors stemming from both design flaws and malfunctions may be efficiently detected.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of detecting errors in a result of a fixed-point division operation, the method comprising:
    performing, by a division circuit, a fixed-point division operation for a dividend and a divisor to produce a final result, the final result including a quotient;
    providing a sign of the dividend, the divisor and the result of the operation to an error detection processing unit; and
    performing, by the error detection processing unit, an error detection operation, the error detection operation including:
        after receiving the final result from the division circuit, calculating a remainder from the quotient produced by the fixed-point division operation, the dividend and the divisor;
        performing a first comparison of at least one of:
        an absolute value of the divisor and an absolute value of the remainder, and
        a magnitude of the divisor and a magnitude of the remainder;
        performing a second comparison of the sign of the dividend and a sign of the remainder; and
        determining whether the final result is correct based on the first comparison and the second comparison.

2. The method of claim 1, wherein determining comprises determining that the final result is correct if the sign of the dividend is the same as the sign of the remainder, and the absolute value of the remainder is less than the absolute value of the divisor.

3. The method of claim 1, wherein determining comprises determining that the final result is correct if the sign of the dividend is the same as the sign of the remainder, and the magnitude of the remainder is less than or equal to the magnitude of the divisor.

4. The method of claim 3, wherein the divisor magnitude is a first number of significant bits in the divisor, and the remainder magnitude is a second number of significant bits in the remainder.

5. The method of claim 3, wherein the divisor and the remainder are both in floating point format, the divisor magnitude is the exponent of the divisor, and the remainder magnitude is the exponent of the remainder.

6. The method of claim 1, wherein the remainder is calculated based on the equation:

Remainder=$A-Qt*B$, wherein "A" is the dividend, "B" is the divisor, and "Qt" is the quotient.

7. A computer program product for detecting errors in a result of a fixed point division operation, the computer program product comprising:
    a non-transitory computer-readable storage medium for storing instructions for executing a method of:
    performing, by a division circuit, a fixed-point division operation for a dividend and a divisor to produce a final result, the final result including a quotient;
    providing a sign of the dividend, the divisor and the result of the operation to an error detection processing unit;

performing, by the error detection processing unit, an error detection operation, the error detection operation including:
after receiving the final result from the division circuit, calculating a remainder from the quotient produced by the fixed-point division operation, the dividend and the divisor;
performing a first comparison of at least one of:
an absolute value of the divisor and an absolute value of the remainder, and
a magnitude of the divisor and a magnitude of the remainder;
performing a second comparison of the sign of the dividend and a sign of the remainder; and
determining whether the final result is correct based on the first comparison and the second comparison.

8. The computer program product of claim 7, wherein determining comprises determining that the final result is correct if the sign of the dividend is the same as the sign of the remainder, and the absolute value of the remainder is less than the absolute value of the divisor.

9. The computer program product of claim 7, wherein the remainder is calculated based on the equation:

$$\text{Remainder} = A - Qt*B,$$

wherein "A" is the dividend, "B" is the divisor, and "Qt" is the quotient.

10. A system for detecting errors in a result of a fixed point division operation, the system comprising:
an instruction dispatching unit (IDU) for sending an instruction to perform a division operation for a dividend and a divisor; and
a division circuit in operable communication with the IDU, the division circuit configured to perform:
receiving the instruction from the IDU;
calculating a final result of a fixed point division operation for a dividend and a divisor, the final result including a quotient; and
an error detection processing unit in operable communication with the processor, the error detection processing unit configured to receive a sign of the dividend, the divisor and the result of the operation from the division circuit, the error detection processing unit configured to perform an error detection operation, the error detection operation including:
after receiving the final result from the division circuit, calculating a remainder from the quotient, the dividend and the divisor;
performing a first comparison of at least one of:
an absolute value of the divisor and an absolute value of the remainder, and
a magnitude of the divisor and a magnitude of the remainder;
performing a second comparison of the sign of the dividend and a sign of the remainder; and
determining whether the final result is correct based on the first comparison and the second comparison.

11. The system of claim 10, wherein determining comprises determining that the final result is correct if the sign of the dividend is the same as the sign of the remainder, and the absolute value of the remainder is less than the absolute value of the divisor.

* * * * *